US009175185B2

(12) United States Patent
Fichtner et al.

(10) Patent No.: US 9,175,185 B2
(45) Date of Patent: *Nov. 3, 2015

(54) COATING COMPOSITIONS HAVING HIGH WEATHERING RESISTANCE, PROCESS FOR PREPARATION THEREOF AND USE THEREOF

(75) Inventors: Thomas Fichtner, Dalheim (DE); Harald Petri, Aarbergen (DE); Stephan Krieger, Hofheim (DE); Ivan Cabrera, Dreieich (DE)

(73) Assignee: Celanese Emulsions GmbH, Kronberg (DE)

(*) Notice: Subject to any disclaimer, the term of this patent is extended or adjusted under 35 U.S.C. 154(b) by 589 days.

This patent is subject to a terminal disclaimer.

(21) Appl. No.: 12/173,338

(22) Filed: Jul. 15, 2008

(65) Prior Publication Data
US 2009/0069495 A1    Mar. 12, 2009

(30) Foreign Application Priority Data
Jul. 19, 2007 (DE) .................. 10 2007 033 596

(51) Int. Cl.
C08L 31/02 (2006.01)
C08L 31/04 (2006.01)
C09D 131/04 (2006.01)
C09D 5/02 (2006.01)
C09D 7/12 (2006.01)
C09D 133/12 (2006.01)
C08K 3/00 (2006.01)

(52) U.S. Cl.
CPC .............. C09D 131/04 (2013.01); C09D 5/024 (2013.01); C09D 7/1208 (2013.01); C09D 133/12 (2013.01); C08K 3/0033 (2013.01)

(58) Field of Classification Search
CPC .... C09D 5/024; C09D 131/04; C08F 263/02; C08F 2/24; C08K 3/0033; C08L 31/04
USPC .......... 523/201; 524/458, 459, 460, 503, 517, 524/522, 523, 524, 555, 559, 560, 564, 588, 524/599; 526/201, 202
See application file for complete search history.

(56) References Cited

U.S. PATENT DOCUMENTS

| 2,566,251 | A | * | 8/1951 | Richards ..................... 524/460 |
| 2,628,948 | A | | 2/1953 | Kunze et al. |
| 3,301,809 | A | | 1/1967 | Goldberg et al. |
| 3,524,828 | A | | 8/1970 | Keithley |
| 3,563,851 | A | | 2/1971 | Armour et al. |
| 3,644,262 | A | | 2/1972 | Stehle et al. |
| 3,647,735 | A | | 3/1972 | Brodnyan |
| 3,931,088 | A | | 1/1976 | Sakurada et al. |
| 3,932,335 | A | | 1/1976 | Gorton |
| 4,100,137 | A | | 7/1978 | Lemieux et al. |
| 4,118,357 | A | | 10/1978 | Brabetz et al. |
| 4,269,749 | A | | 5/1981 | Marriott et al. |
| 4,542,181 | A | | 9/1985 | Schuppiser et al. |
| 4,616,057 | A | | 10/1986 | Lindemann et al. |
| 4,634,727 | A | | 1/1987 | Kamikaseda et al. |
| 4,683,165 | A | | 7/1987 | Lindemann et al. |
| 4,999,218 | A | | 3/1991 | Rehmer et al. |
| 5,047,295 | A | | 9/1991 | Dotzauer et al. |
| 5,073,578 | A | | 12/1991 | Boodaghains et al. |
| 5,162,415 | A | | 11/1992 | Rehmer et al. |
| 5,545,684 | A | | 8/1996 | Jakob et al. |
| 5,614,049 | A | | 3/1997 | Kohlhammer et al. |
| 5,744,418 | A | | 4/1998 | Jakob |
| 5,747,578 | A | * | 5/1998 | Schmitz et al. ............... 524/502 |
| 5,750,617 | A | | 5/1998 | Eck et al. |
| 5,846,601 | A | | 12/1998 | Ritter et al. |
| 6,054,519 | A | | 4/2000 | Jakob et al. |
| 6,093,766 | A | | 7/2000 | Jakob et al. |
| 6,122,860 | A | | 9/2000 | Von Tapavicza et al. |
| 6,265,028 | B1 | | 7/2001 | Zhao et al. |
| 6,476,097 | B1 | | 11/2002 | Zhao et al. |
| 6,476,124 | B1 | | 11/2002 | Mougin |
| 6,569,279 | B1 | | 5/2003 | Park et al. |

(Continued)

FOREIGN PATENT DOCUMENTS

DE     2261402          7/1974
DE     2620738 A1    12/1977

(Continued)

OTHER PUBLICATIONS

Publication, "Emulsion Polymerization and Emulsion Polymers", Peter A. Lovell and Mohamed S. El-Aasser, Wiley, New York 1997, pp. 26-31.
European Search Report EP 08 01 1292, dated Dec. 17, 2008.
Dimonie et al., "Control of Particle Morphology," *Emulsion Polymerization and Emulsion Polymer*, Edited by Peter A. Lovell and Mohamed S. El-Aasser, pp. 294-326 (Apr. 1997).
Robert G. Gilbert, "Emulsion Polymerization—A Mechanistic Approach,", *Academic Press*, pp. 15-18 (1995).
Jonsson et al., "Polymerization Conditions and the Development of a Core-Shell Morphology in PMMA/PS Latex Particles. 1. Influence of Initiator Properties and Mode of Monomer Addition," *American Chemical Society*, Macromolecules, vol. 27, No. 7, pp. 1932-1937 (1994).

(Continued)

*Primary Examiner* — David W Wu
*Assistant Examiner* — Marie Reddick
(74) *Attorney, Agent, or Firm* — Dority & Manning, P.A.

(57) ABSTRACT

What are described are coating compositions comprising pigments and/or fillers and multistage polyvinyl ester dispersions as binders. These binders are produced by a selected multistage process in which a polyvinyl ester dispersion is obtained in a first stage, monomers in dissolved or pure form or in the form of an emulsion are added to the reaction mixture in a second stage and then the polymerization is started again. The polyvinyl ester dispersions comprise polymerized silanes and/or epoxides or the polyvinyl ester dispersions have only a small content of protective colloids, if any. The coating compositions formulated with the multistage polyvinyl ester dispersions obtained in this way are notable for a very high weathering resistance.

27 Claims, No Drawings

(56) References Cited

U.S. PATENT DOCUMENTS

| | | | |
|---|---|---|---|
| 6,667,352 B1* | 12/2003 | Kusters et al. | 523/201 |
| 6,706,805 B2* | 3/2004 | Weitzel | 524/563 |
| 6,710,113 B2 | 3/2004 | Weitzel | |
| 6,790,272 B1 | 9/2004 | Zhao et al. | |
| 7,015,332 B2 | 3/2006 | Loccufier | |
| 7,078,455 B2 | 7/2006 | Heldmann et al. | |
| 7,585,915 B2 | 9/2009 | Jakob et al. | |
| 8,030,391 B2* | 10/2011 | Petri et al. | 524/457 |
| 2004/0048961 A1 | 3/2004 | Klein et al. | |
| 2004/0068042 A1 | 4/2004 | Bachon et al. | |
| 2004/0077782 A1* | 4/2004 | Heldmann et al. | 524/804 |
| 2005/0032970 A1 | 2/2005 | Jakob et al. | |
| 2007/0060702 A1 | 3/2007 | Gao et al. | |
| 2007/0112117 A1 | 5/2007 | Weitzel | |
| 2008/0206582 A1 | 8/2008 | Scholtyssek et al. | |
| 2009/0043035 A1* | 2/2009 | Cabrera | 524/457 |
| 2009/0281218 A1 | 11/2009 | Hardt et al. | |

FOREIGN PATENT DOCUMENTS

| | | |
|---|---|---|
| DE | 38 27 975 | 3/1990 |
| DE | 39 01 073 | 7/1990 |
| DE | 3942628 A1 | 6/1991 |
| DE | 4003422 A | 8/1991 |
| DE | 4118634 A1 | 12/1992 |
| DE | 4431343 A1 | 4/1996 |
| DE | 19548314 A1 | 6/1997 |
| DE | 19649419 A1 | 6/1998 |
| DE | 19701325 A1 | 7/1998 |
| DE | 19739936 A1 | 3/1999 |
| DE | 19811314 A1 | 9/1999 |
| DE | 19830555 A1 | 1/2000 |
| DE | 19853461 A1 | 5/2000 |
| DE | 100 48 888 A1 | 4/2002 |
| DE | 101 26 560 C1 | 9/2002 |
| DE | 10112431 A1 | 10/2002 |
| DE | 101 22 786 A1 | 11/2002 |
| DE | 102 36 395 A1 | 2/2004 |
| DE | 60004914 T2 | 7/2004 |
| DE | 10329594 | 1/2005 |
| DE | 10335673 A1 | 3/2005 |
| DE | 10 2005 032 194 A1 | 1/2007 |
| DE | 10 2005 05764 A1 | 6/2007 |
| DE | 10 2006 013 898 A1 | 9/2007 |
| EP | 0050548 A1 | 4/1982 |
| EP | 0191460 A2 | 8/1986 |
| EP | 0191460 A3 | 8/1986 |
| EP | 0206059 A2 | 12/1986 |
| EP | 0206059 A3 | 12/1986 |
| EP | 0256391 A2 | 2/1988 |
| EP | 0256391 A3 | 2/1988 |
| EP | 0347760 B1 | 12/1989 |
| EP | 0 381 122 A2 | 8/1990 |
| EP | 0413136 A2 | 2/1991 |
| EP | 0413136 A3 | 2/1991 |
| EP | 0 417 568 | 3/1991 |
| EP | 0444827 A1 | 9/1991 |
| EP | 0554747 A2 | 8/1993 |
| EP | 0554747 A3 | 8/1993 |
| EP | 0 581 264 A1 | 2/1994 |
| EP | 0609756 A2 | 8/1994 |
| EP | 0609756 A3 | 8/1994 |
| EP | 0686682 A1 | 12/1995 |
| EP | 0705896 A1 | 4/1996 |
| EP | 0 710 675 A2 | 5/1996 |
| EP | 0778290 A2 | 6/1997 |
| EP | 0778290 A3 | 6/1997 |
| EP | 0829509 A1 | 3/1998 |
| EP | 0834530 A1 | 4/1998 |
| EP | 0970993 A1 | 1/2000 |
| EP | 1018535 A1 | 7/2000 |
| EP | 1134244 A2 | 9/2001 |
| EP | 1134244 A3 | 9/2001 |
| EP | 1 174 447 A | 1/2002 |
| EP | 1170311 A1 | 1/2002 |
| EP | 1237519 A1 | 9/2002 |
| EP | 1505085 A1 | 2/2005 |
| GB | 690299 | 4/1953 |
| GB | 1212165 | 11/1970 |
| GB | 1297709 | 11/1972 |
| JP | 55157641 A | 12/1980 |
| JP | 56125446 A | 10/1981 |
| JP | 63265983 | 11/1988 |
| JP | 1229085 A | 9/1989 |
| JP | 08291469 A | 11/1996 |
| JP | 10121017 A | 5/1998 |
| JP | 2001 335763 A | 12/2001 |
| WO | WO 9636648 A1 | 11/1996 |
| WO | WO 9803604 A1 | 1/1998 |
| WO | WO 9812237 A1 | 3/1998 |
| WO | WO 0002967 A1 | 1/2000 |
| WO | WO 02074856 A2 | 9/2002 |
| WO | WO 2006/111290 A | 10/2006 |
| WO | WO 2007/006413 A1 | 1/2007 |

OTHER PUBLICATIONS

Yu et al., "Study of Particle Morphology in Polymer Emulsions and Their Minimum Film Formation Temperatures," *Journal of Applied Polymer Science*, vol. 41, 1990, pp. 1965-1972 (1990).

Dimonie et al., "Control of Particle Morphology," *Emulsion Polymerization and Emulsion Polymer*, Edited by Peter A. Lovell and Mohamed S. El-Aasser, pp. 294-326.

Robert G. Gilber, "Emulsion Polymerization—A Mechanistic Approach,", *Academic Press*, pp. 15-18.

Jonsson et al., "Polymerization Conditions and the Develop: Morphology in PMMA/PS Latex Particles. Initiator Properties and Mode of Monomer," *American Chemcial Society*, Macromolecules, vol. 27, No. 7, pp, 1932-1937.

Yu et al., "Study of Particle Morphology in Polymer Emulsions and Their Minimum Film Formation Temperatures," *Journal of Applied Polymer Science*, vol. 41, 1990, pp. 1965-1972.

Search Report for PCT/EP 2006/006173 dated Oct. 20, 2006, 4 pages.

Translation of International Preliminary Report on Patentability dated Jun. 12, 2008, 6 pages.

Search Report for PCT/EP2006/011206 dated Mar. 16, 2007, 4 pages.

International Preliminary Report on Patentability for PCT/EP2006/011206, 7 pages, Mar. 16, 2007.

European Search Report EP 08 01 1291, dated Jan. 23, 2009.

Search Report for PCT/EP2008/001090 dated Jun. 23, 2008, 6 pages.

International Preliminary Report on Patentability (Written Opinion) for PCT/EP2008/001090 dated Oct. 6, 2009, 7 pages.

Search Report for PCT/EP2008/004191 dated Oct. 1, 2008, 4 pages.

* cited by examiner

COATING COMPOSITIONS HAVING HIGH WEATHERING RESISTANCE, PROCESS FOR PREPARATION THEREOF AND USE THEREOF

The present invention relates to coating compositions comprising binders based on polyvinyl ester dispersions prepared in a multistage process, to the preparation thereof, and to the use of these coating compositions, especially for architectural preservation such as emulsion paints. The coatings produced from these emulsion paints have a very good weathering resistance comparable to the emulsion paints comprising binders based on polyacrylate.

Polymer dispersions derived from vinyl esters and monomers copolymerizable therewith and their use as binders for architectural preservatives are known and have already been described many times. Such polymer dispersions are typically prepared by emulsion polymerization; the polymerization can be effected in one or more stages. In the polymerization processes which have become known to date, monomer mixtures are converted by free-radical polymerization by addition of initiators in the presence of protective colloids and/or emulsifiers. The monomers are added before or during the free-radical polymerization.

Some combinations of monomers are difficult to polymerize with one another. This is manifested in highly variable copolymerization parameters (cf. P. A. Lowell, Emulsion Polymerization and Emulsion Polymers, Wiley, New York 1997, pp. 26-31). In such cases, it may be the case that no copolymers form, but rather two separate homopolymers independently. The prior art already discloses several processes for inducing monomers which are actually difficult to react with one another to form copolymers.

For instance, EP-A-710,675 describes a process for polymerizing monomers of which at least one has a poor water solubility, or for polymerization in which a polymer with a poor water solubility forms. The process includes the use of a macromer with a hydrophobic cavity, for example of a cyclodextrin, during the polymerization. In one variant of the process, the copolymerization proceeds in an aqueous system in the presence of this macromer, in which case the sparingly water-soluble monomer is first complexed in the macromer and then the polymerization proceeds, preferably in the presence of a further water-soluble monomer. The resulting dispersions are used as binders for coating compositions, as adhesives, plastics additives or additives for petroleum products.

EP-A-381,122 describes a two-stage polymerization for preparing a vinyl acetate copolymer emulsion. The copolymer contains comonomers incompatible with vinyl acetate. The process comprises, in a first stage, the emulsion polymerization of vinyl acetate and optionally further comonomers until the virtually complete conversion of the vinyl acetate, and, in a second stage, the addition and polymerization of a second monomer incompatible with vinyl acetate. In the process, no further stabilizer is added during the second stage and the copolymerization of the second stage begins immediately after addition of the incompatible monomer, without a partition equilibrium being able to establish itself between the incompatible monomer and the reaction product of the first stage. The resulting multistage polymers are used as binders for nonwovens or for textile fabric.

U.S. Pat. No. 4,616,057 describes a polymer emulsion comprising an interpenetrating network. The document describes the multistage emulsion polymerization of vinyl acetate and a crosslinking monomer copolymerizable therewith, such as N-methylolacrylamide, and with monomers which are barely copolymerizable therewith, if at all, such as methyl methacrylate or styrene. In the first stage, the process comprises the preparation of a first emulsion polymer. To the product of the first stage is added a second emulsion which comprises a monomer different from the monomer of the first stage and the establishment of an equilibrium is awaited. Thereafter, the second stage of the emulsion polymerization is started, and an interpenetrating network with physically distinguishable polymers forms. The resulting dispersions are used as binders for nonwovens and other textile fabrics, as coating compositions and as adhesives.

EP-A-581,264 describes mixtures of copolymers essentially consisting of vinyl acetate-ethylene copolymers and selected styrene or acrylate copolymers with a comparatively high proportion of polymerized acrylic acid or of maleic anhydride. The dispersions described include those derived from vinyl acetate and ethylene, which are admixed with styrene or selected acrylates and with comparatively high amounts of acrylic acid or maleic anhydride and are then subjected to a polymerization. As a result of the high acid (anhydride) contents, the resulting blends or dispersions tend to form high viscosities. The blends described are proposed for use as molding materials, for production of coatings, as adhesives or for use in emulsions.

DE 10 2006 013 898 A1 describes polymer dispersions comprising at least two copolymers A and B with different glass transition temperatures and at least one selected nonionic emulsifier. The copolymers can be used in the form of polymer mixtures or as two-stage polymers.

DE 10 2005 032 194 A1 describes aqueous polymer dispersions comprising predominantly multistage polymers stabilized by nonionic emulsifiers. These are derived from hard and soft monomer compositions which comprise vinyl esters, at least one of which comprises an organosilicon compound. The dispersions can be used as binders in emulsion paints or other coatings.

DE 102 36 395 A1 describes aqueous polymer dispersions for corrosion protection with good antirust properties. These contain emulsifiers containing phosphate groups. In the polymer dispersions, it is possible to use multistage polymers among other substances.

EP 1 370 621 B1 describes aqueous polymer dispersions based on a vinyl ester copolymer which is obtainable by multistage polymerization of a hard monomer mixture and a soft monomer mixture, and which comprises a selected and predominantly ionic stabilization system. The dispersions can be used as binders in coating compositions.

DE 101 26 560 C1 describes the use of mixed polymers of particular copolymers, also including vinyl ester copolymers, in building materials. The copolymerization proceeds in two stages in the presence of comparatively large amounts of protective colloid. The products are suitable for producing readily redispersible powders. They are used as a further binder in building materials which comprise further binders formed from hydraulically setting materials.

It is an object of the present invention to provide coating compositions which are based on polyvinyl ester binders and whose films have a very high weathering resistance.

For many fields of application, coating compositions which give rise to films with only low reemulsifibility, if any, are desired. There is neither any tendency to form water spots on the coated surface nor is there any formation of so-called snail trails. In addition, films formed from such coating compositions have a low water absorption.

It has been found that coating compositions with only low contents, if any, of protective colloids and/or of emulsifiers possess this profile of properties.

For other fields of use, coating compositions which give rise to films with high adhesive tensile strength are desired. It has been found that coating compositions comprising binders which contain copolymerized silane and/or epoxide units possess this profile of properties.

It has now been found that, surprisingly, the use of polyvinyl ester dispersions prepared by a selected and multistage process allows the formulation of coating compositions with these properties, which are additionally notable for a surprisingly high weathering resistance.

In one embodiment, the invention relates to coating compositions comprising pigments and/or fillers and a multistage polyvinyl ester dispersion, which is obtainable by
  i) polymerizing at least one vinyl ester of a saturated carboxylic acid and optionally further monomers copolymerizable therewith in the presence of at least one emulsifier and/or at least one protective colloid up to a conversion of at least 90% of the monomers used,
  ii) adding at least one free-radically polymerizable monomer other than the vinyl ester used in step i) in pure form or in the form of a solution or in the form of an emulsion to the polymerization mixture obtained in step i), and
  iii) adding at least one initiator of free-radical polymerization after the addition of the monomer(s) in step ii) has ended, such that the monomer(s) added in step ii) are polymerized in the presence of the dispersion obtained in step i), wherein
  iv) in step i) and/or in step ii), at least one monomer containing ethylenically unsaturated silane groups and/or at least one ethylenically unsaturated epoxide compound is used.

In a further embodiment, the invention relates to coating compositions comprising pigments and/or fillers, and a multistage polyvinyl ester dispersion which is obtainable by
  i) polymerizing at least one vinyl ester of a saturated carboxylic acid and optionally further monomers copolymerizable therewith in the presence of at least one emulsifier and/or at least one protective colloid up to a conversion of at least 90% of the monomers used,
  ii) adding at least one free-radically polymerizable monomer other than the vinyl ester used in step i) in pure form, in the form of a solution or in the form of an emulsion to the polymerization mixture obtained in step i), and
  iii) adding at least one initiator of free-radical polymerization after the addition of the monomer(s) in step ii) has ended, such that the monomer(s) added in step ii) are polymerized in the presence of the dispersion obtained in step i), wherein
  iv) the content of protective colloid, based on the total monomer content is from 0 to less than 1% by weight.

Films formed from these coating compositions have, after outdoor weathering, an exceptionally high shade stability. This can be determined to DIN 6174 by determining the L, a and b values with a color guide spectrophotometer (from Byk-Gardner).

The inventive coating compositions are characterized by the use of selected multistage polyvinyl ester dispersions as binders. These binders are characterized by the above-described special method of preparation. Multistage polyvinyl ester dispersions with the same monomer composition, which have been obtained in a conventional manner by copolymerizing all monomers together, do not exhibit such high shade stabilities.

Preferred polyvinyl ester dispersions used in accordance with the invention have only low screen residues, for example a screen residue, measured with a 40 μm screen, of less than 0.05% by weight, preferably less than 0.02% by weight, more preferably less than 0.008% by weight, based on the dispersion.

The screen residue is determined in analogy to DIN 53786. To this end, the dispersion is passed through a screen with mesh size 40 μm. The screen residue is determined by the following formula:

screen residue (%)=[($G1-G2$)×100]/starting weight

In this formula,
$G1$ is the weight of the dried screen with coagulum in g
$G2$ is the weight of the dried screen without coagulum in g, and
Starting weight is the amount of dispersion in g which has been passed through the screen.

Preference is given to using the above-described multistage polyvinyl ester dispersions which have a content of emulsifiers of up to 5.0% by weight, more preferably up to 3.65% by weight, even more preferably of up to 3% by weight, especially of less than 1% by weight, based on the total mass of monomers used. Very particular preference is given to using the above-described multistage polyvinyl ester dispersions which contain no or up to 3% by weight, especially up to 1% by weight, of emulsifiers and which are additionally stabilized by protective colloids, preferably of less than 1% by weight, based on the total monomer content, of protective colloids.

Preference is likewise given to using the above-described multistage polyvinyl ester dispersions in which the content of structural units containing acid groups and/or acid anhydride groups does not exceed 6% by weight, more preferably 3% by weight, based on the total amount of monomers.

In the context of this description, the expression "in pure form" is understood to mean that the monomers are added to the polymerization mixture without further addition. A special purification of the monomers is not required.

Multistage polyvinyl ester dispersions in which the monomer in step ii) is used in the form of an emulsion are described in U.S. Pat. No. 4,616,057.

Particular preference is given to using multistage polyvinyl ester dispersions in which the monomer in step ii) is used in pure form.

It is assumed that, by virtue of the addition of the monomers in steps ii) under conditions under which virtually no further polymerization reactions proceed in the polymerization mixture, and the awaiting of the restart of the polymerization in step iii), a partition equilibrium is established between the monomer added in stage ii) and the reaction product of stage i). The monomers hydrophobic with respect to water which are added in step ii) probably diffuse fully into the polymer particles prepared in step i) and are polymerized into these particles when the polymerization restarts. This form of emulsion polymerization is therefore also referred to as inclusion polymerization.

The restart of the polymerization in step iii) can be effected immediately after the addition of the monomer(s) in step ii), or the polymerization mixture is left to stand for a further period, for example from 10 to 60 minutes, before the initiator is added, in order to start step iii).

The polymer particles prepared by inclusion polymerization are generally larger than the particles of the same monomer composition prepared by conventional emulsion polymerization. Typically, the mean particle sizes of the dispersions prepared by inclusion polymerization are at least 10% greater than the mean particle sizes of dispersions of the same monomer composition prepared by conventional one-stage emulsion polymerization.

Moreover, the glass transition temperatures of the dispersions prepared by inclusion polymerization differ from the glass transition temperatures of dispersions comprising particles of the same monomer composition which have been prepared by conventional one-stage emulsion polymerization.

The glass transition temperatures of the multistage polyvinyl esters used in accordance with the invention can vary within wide ranges. For typical copolymers used in accordance with the invention, they vary within the range from −50° C. to +110° C., preferably from −30° C. to +40° C., determined by differential scanning calorimetry at a heating rate of 10 K/minute. The glass transition temperatures of the multistage polyvinyl esters can be adjusted by selection of the monomer combinations in a manner known per se by the person skilled in the art.

The monomers used to prepare the binders used in accordance with the invention are known per se.

The vinyl esters of a saturated carboxylic acid used in step i) include vinyl esters of straight-chain and/or branched aliphatic carboxylic acids having from one to eighteen carbon atoms. In addition, it is also possible to use vinyl esters of aromatic carboxylic acids. Apart from the vinyl radical, these vinyl esters contain no further functional groups, for example acetoacetate groups having crosslinking action.

The preferred monomers of this type include vinyl formate, vinyl acetate, vinyl propionate, vinyl butyrate, vinyl isobutyrate, vinyl pivalate, vinyl 2-ethylhexanoate, vinyl esters of saturated branched monocarboxylic acids having from 9 to 11 carbon atoms in the acid radical, vinyl esters of relatively long-chain saturated or unsaturated fatty acids, for example vinyl laurate or vinyl stearate, and also vinyl esters of benzoic acid and substituted derivatives of benzoic acid such as vinyl p-tert-butylbenzoate. Among these, vinyl acetate is particularly preferred.

The vinyl esters mentioned can be used individually in the preparation of the dispersions used in accordance with the invention in step i), or may preferably be present in a mixture with other monomers which may or may not be vinyl esters. The proportion of the vinyl esters in step i), based on the total amount of monomers used in this step, is generally at least 40% by weight, preferably at least 70% by weight.

In the preparation of the multistage polyvinyl ester dispersions used in accordance with the invention, further monomers may optionally be used in step i). These are ethylenically unsaturated comonomers which can be copolymerized with vinyl esters of saturated carboxylic acids. They may be comonomers which can be copolymerized in a simple manner with the vinyl esters; however, it is also possible to use comonomers which can be copolymerized together with the vinyl esters only in small amounts. In these cases, the person skilled in the art will select the amounts of the individual monomers such that the initially charged comonomers are consumed in the copolymerization.

Optional comonomers used with preference in step i) are ethylenically unsaturated aliphatic or cycloaliphatic hydrocarbons, especially α-olefins having 2-12 carbon atoms, such as ethylene, propylene and/or butylene; and halogenated unsaturated aliphatic hydrocarbons, for example vinyl chloride, vinyl fluoride, vinylidene chloride, vinylidene fluoride. The proportion of these comonomers in the total amount of monomers used in step i) is up to 50% by weight, preferably up to 25% by weight.

Further optional comonomers used in step i) are α,β-unsaturated monocarboxylic acids, for example acrylic acid, methacrylic acid and/or itaconic acid. It is also possible to use α,β-unsaturated dicarboxylic acids, for example maleic acid, fumaric acid, itaconic acid and/or citraconic acid. The proportion of these comonomers in the total amount of monomers used in step i) is up to 5% by weight, preferably up to 3% by weight.

Further optional comonomers used with preference in step i) are ethylenically unsaturated sulfonic acids and/or ethylenically unsaturated phosphonic acids or salts thereof, preferably vinylsulfonic acid, vinylphosphonic acid and/or 2-acrylamido-2-methylpropanesulfonic acid. The proportion of these comonomers in the total amount of monomers used in step i) is up to 5% by weight, preferably up to 3% by weight.

Further optional comonomers used with preference in step i) are esters of α,β-unsaturated monocarboxylic acids and/or monoesters or preferably diesters of α,β-unsaturated dicarboxylic acids with primary, secondary and/or tertiary saturated monohydric alcohols having from 1 to 20 carbon atoms. These may, for example, be the methyl, ethyl, propyl, butyl or the 2-ethylhexyl esters of acrylic acid, of methacrylic acid and/or itaconic acid, or the corresponding monoesters or especially diesters of maleic acid, fumaric acid or citraconic acid, and also the esters of the mono- and/or dicarboxylic acids mentioned with cycloaliphatic or polycyclic alcohols and of fatty alcohols. The proportion of these comonomers in the total amount of monomers used in step i) is up to 25% by weight, preferably up to 15% by weight.

Further optional comonomers used with preference in step i) are epoxy-functional, ethylenically unsaturated compounds, such as glycidyl methacrylate, glycidyl acrylate and/or vinylepoxycyclohexane. The proportion of these comonomers in the total amount of monomers used in step i) is up to 10% by weight, preferably up to 5% by weight.

Further optional comonomers used with preference in step i) are silicone-functional, ethylenically unsaturated compounds such as acryloyloxyalkyltri(alkoxy)silanes and methacryloyloxyalkyltri(alkoxy)silanes, vinyltrialkoxysilanes and/or vinylalkyldialkoxysilanes. The proportion of these comonomers in the total amount of monomers used in step i) is up to 10% by weight, preferably up to 5% by weight.

In a variant of the multistage polyvinyl ester dispersions used in accordance with the invention, as well as the vinyl ester of saturated carboxylic acids, at least one ethylenically unsaturated comonomer containing silane groups and/or at least one ethylenically unsaturated epoxide compound is used. In the second variant of the multistage polyvinyl ester dispersions used in accordance with the invention, it is not absolutely necessary to use these comonomers, but it is preferred.

Further optional comonomers used with preference in step i) are polyethylenically unsaturated and hence crosslinking comonomers, for example diallyl phthalate, diallyl maleate, triallyl cyanurate, tetraallyloxyethane, divinylbenzene, butanediol 1,4-dimethacrylate, triethylene glycol dimethacrylate, divinyl adipate, allyl (meth)acrylate, vinyl crotonate, methylenebisacrylamide, hexanediol diacrylate, pentaerythritol diacrylate and trimethylolpropane triacrylate, or mixtures of two or more compounds from this group. The proportion of these comonomers in the total amount of monomers used in step i) is up to 10% by weight, preferably up to 2% by weight.

Further optional comonomers used with preference in step i) are hydroxy-functional esters of unsaturated carboxylic acids, such as hydroxyethyl(meth)acrylate, hydroxypropyl (meth)acrylate and adducts thereof with ethylene oxide or propylene oxide. The proportion of these comonomers in the total amount of monomers used in step i) is up to 25% by weight, preferably up to 15% by weight.

Further optional comonomers used with preference in step i) are ethylenically unsaturated compounds containing crosslinkable groups, such as carbonyl groups or N-methylol groups. Examples thereof are diacetoneacrylamide, allyl acetoacetate, vinyl acetoacetate, acetoacetoxyethyl(meth) acrylate, N-ethanol(meth)acrylamide, N-propanol(meth) acrylamide, (meth)acrylamide, allyl carbamate, acrylonitrile, the N-methylol esters, N-methylol alkyl ethers or Mannich bases of N-methylol(meth)acrylamide or N-methylolallyl carbamate, acrylamidoglycolic acid and/or salts thereof, methyl acrylamidomethoxyacetate, N-(2,2-dimethoxy-1-hydroxyethyl)acrylamide, N-dimethylaminopropyl(meth)acrylamide, N-methyl(meth)acrylamide, N-butyl(meth)acrylamide, N-cyclohexyl(meth)acrylamide, N-dodecyl(meth) acrylamide, N-benzyl(meth)acrylamide, p-hydroxyphenyl (meth)acrylamide, N-(3-hydroxy-2,2-dimethylpropyl) methacrylamide, ethylimidazolidone methacrylate or N-vinylformamide, N-vinylpyrrolidone. The proportion of these comonomers in the total amount of monomers used in step i) is up to 10% by weight, preferably up to 5% by weight.

The proportion of other comonomers used in addition to the vinyl esters in step i) may be up to 60% by weight in total.

In step ii) of the above-described process, the abovementioned monomers can be used. In the monomers used in step ii) in the individual case, at least one of the monomers used in step ii) differs from the monomers used in step i).

In principle, it is possible to use any combinations of the abovementioned monomers in steps i) and ii) of the above-described process, although at least one vinyl ester of a saturated carboxylic acid is used in step i). The total amount of monomers having acid groups and/or having anhydride groups used preferably does not exceed 6% by weight, based on the total amount of monomers.

The monomer classes usable in step ii) are thus generally vinyl esters of straight-chain and/or branched aliphatic carboxylic acids having from one to eighteen carbon atoms, vinyl esters of aromatic carboxylic acids, ethylenically unsaturated aliphatic or cycloaliphatic hydrocarbons, vinylaromatics, especially styrene, α-methylstyrene, vinyltoluene and/or vinyl xylene, halogenated unsaturated aliphatic hydrocarbons, α,β-unsaturated mono- and/or dicarboxylic acids, ethylenically unsaturated sulfonic acids and/or phosphonic acids or salts thereof, esters of α,β-unsaturated monocarboxylic acids with primary, secondary and/or tertiary saturated monohydric alcohols having from 1 to 20 carbon atoms, monoesters or preferably diesters of α,β-unsaturated dicarboxylic acids with primary, secondary and/or tertiary saturated monohydric alcohols having from 1 to 20 carbon atoms, epoxy-functional ethylenically unsaturated compounds, silicone-functional ethylenically unsaturated compounds, polyethylenically unsaturated and hence crosslinking comonomers, hydroxy-functional esters of unsaturated carboxylic acids, and crosslinkable or self-crosslinking ethylenically unsaturated comonomers.

The weight ratios of the monomers used in steps i) and ii) of the above-described process can be varied within wide ranges, for example from 10:90 to 90:10, preferably from 80:20 to 20:80 and more preferably from 60:40 to 40:60. The quantitative ratios to be selected in the individual case depend on the nature of the individual monomers and on the properties desired in the individual case and can be selected in a manner known per se by the person skilled in the art.

In the preparation of the multistage polyvinyl ester dispersions used in accordance with the invention, preference is given to using different vinyl esters of saturated carboxylic acids in steps i) and ii); very particular preference is given to using, in step i), a combination of at least one vinyl ester of saturated carboxylic acids with at least one α-olefin, especially with ethylene.

In a further preferred variant of the multistage polyvinyl ester dispersion used in accordance with the invention, monomers which can be copolymerized only poorly with vinyl esters of saturated carboxylic acids are used in step ii). These include especially vinylaromatics and/or esters of mono- or dicarboxylic acids, very particularly styrene, acrylates and/or methacrylates.

It has been found that, surprisingly, these monomers which are copolymerizable poorly or almost not at all with vinyl esters of saturated carboxylic acids can be incorporated into the polymer dispersion in large amounts by the process according to the invention. However, it is not possible as yet to explain exactly the manner in which this incorporation proceeds. It appears to be influenced by the monomer combination used in steps i) and ii). In some systems, particles of grafted copolymers appear to form; in other systems, in contrast, polymodal particle size distributions have been observed and indications that different particles with different chemical structure form have been found. What is common to all of these multistage polyvinyl ester dispersions is that, when used as binders in coating compositions, they give rise to films having an exceptionally high weathering resistance compared to films of coating compositions which contain, as binders, dispersions of the same monomer combinations prepared in one step.

Particular preference is given to using polyvinyl ester dispersions obtained in a multistage process for which, in stage i), monomers of types A1, A2 and optionally A4 and/or optionally A5 and/or optionally A6; or monomers of types A1, A3 and optionally A4 and/or optionally A5 and/or optionally A6; or monomers of types A1, A2, A3 and optionally A4 and/or optionally A5 and/or optionally A6 are used, and for which, in stage ii), monomers of types A3 and/or A7 are used.

The type A1 monomers are vinyl esters of straight-chain or branched aliphatic saturated carboxylic acids of chain length $C_1$-$C_4$, for example vinyl formate, vinyl acetate, vinyl propionate, vinyl butyrate or vinyl isobutyrate. Vinyl acetate is preferred. The vinyl esters A1 may also be present in the polyvinyl ester dispersion in combination of two or more thereof alongside one another.

The proportion of monomers A1, optionally in combination with further comonomers from this group, is from 40 to 100% by weight, preferably from 70 to 90% by weight, based on the total amount of monomers used in step i).

The type A2 monomers are branched or straight-chain α-olefins having from 2 to 8 carbon atoms, for example prop-1-ene, but-1-ene, pent-1-ene, hex-1-ene, hept-1-ene, oct-1-ene and especially ethylene.

The proportion of monomers A2, optionally in combination with further comonomers from this group, is from 0 to 45% by weight, preferably from 5 to 45% by weight, more preferably from 8 to 25% by weight, most preferably from 10 to 20% by weight, based on the total amount of monomers used in step i).

The type A3 monomers are vinyl esters of straight-chain or branched aliphatic saturated carboxylic acids of chain length $C_5$-$C_{18}$, for example vinyl esters of α-branched carboxylic acids having from 5 to 11 carbon atoms in the acid radical (®Versatic acids), the vinyl esters of pivalic acid, 2-ethylhexanoic acid, lauric acid, palmitic acid, myristic acid and stearic acid. Vinyl esters of Versatic acids, especially VeoVa® 9, VeoVa® 10 and VeoVa® 11, are preferred. The vinyl esters A3 may also be present in the polyvinyl ester dispersion in combination of two or more thereof alongside one another.

The proportion of the monomers A3, optionally in combination with further comonomers from this group, is from 0 to 60% by weight, preferably from 2 to 40% by weight, more preferably from 4 to 30% by weight, most preferably from 5 to 25% by weight, based on the total amount of monomers used in step i).

The type A4 monomers are ethylenically unsaturated monomers containing silane groups, for example monomers of the general formula $RSi(CH_3)_{0-2}(OR^1)_{3-1}$, where R is defined as $CH_2=CR^2-(CH_2)_{0-1}$ or $CH_2=CR^2CO_2-(CH_2)_{1-3}$, $R^1$ is an unbranched or branched, optionally substituted alkyl radical which has from 1 to 12 carbon atoms and may optionally be interrupted by an ether group, and $R^2$ is H or $CH_3$. Instead of or in addition to these monomers, the type A4 monomers used may also be ethylenically unsaturated epoxide compounds, such as glycidyl methacrylate or glycidyl acrylate. Preference is given to using combinations of ethylenically unsaturated monomers containing silane groups and ethylenically unsaturated epoxide compounds.

The preferred type A4 ethylenically unsaturated monomers containing silane groups are silanes of the formula $CH_2=CR^2-(CH_2)_{0-1}Si(CH_3)_{0-1}(OR^1)_{3-2}$ and $CH_2=CR^2CO_2-(CH_2)_3Si(CH_3)_{0-1}(OR^1)_{3-2}$, where $R^1$ is a branched or unbranched alkyl radical having from 1 to 8 carbon atoms and $R^2$ is H or $CH_3$.

Particularly preferred type A4 silanes are vinylmethyldimethoxysilane, vinylmethyl-diethoxysilane, vinylmethyldi-n-propoxysilane, vinylmethyldiiso-propoxysilane, vinylmethyldi-n-butoxysilane, vinylmethyldi-sec-butoxysilane, vinylmethyldi-tert-butoxysilane, vinylmethyldi-(2-methoxyisopropyloxy)silane and vinylmethyldioctyloxysilane.

Further examples of preferred silanes are γ-(meth)acryloyloxypropyltris(2-methoxyethoxy)silane, γ-(meth)acryloyloxypropyltrismethoxysilane, γ-(meth)acryl-oxypropyl-trisethoxysilane, γ-(meth)acryloyloxypropyltris-n-propoxysilane, γ(meth)acryloyloxypropyltrisisopropoxysilane, γ-(meth)acryloyloxypropyltrisbutoxysilane, γ-acryloyloxypropyltris(2-methoxy-ethoxy)silane, γ-acryloyloxypropyltrismethoxysilane, γ-acryloyloxypropyltrisethoxysilane, γ-acryloyloxypropyltris-n-propoxysilane, γ-acryloyloxypropyltrisisopropoxysilane, γ-acryloyloxypropyltrisbutoxysilane, and also vinyltris(2-methoxyethoxy)silane, vinyltrismethoxysilane, vinyltrisethoxysilane, vinyltris-n-propoxysilane, vinyltrisisopropoxysilane and vinyltrisbutoxysilane. The silane compounds mentioned can optionally also be used in the form of their (partial) hydrolysates.

The proportion of monomers A4, optionally in combination with further comonomers from this group, is from 0 to 10% by weight, preferably from 0.5 to 5% by weight, based on the total amount of monomers used in step i).

The type A5 monomers are ethylenically unsaturated compounds which have at least one stabilizing nonionic or ionic group, preferably an acid group, in the molecule, which additionally stabilize the emulsion polymer by means of polymer-bound functional groups and/or charges.

Suitable comonomers A5 with stabilizing nonionic groups are especially esters of ethylenically unsaturated aliphatic mono- and/or dicarboxylic acids with polyalkylene glycols, preferably with polyethylene glycols and/or polypropylene glycols, or esters of ethylenically unsaturated carboxylic acids with amino alcohols, such as (meth)acrylic esters of amino alcohols, for example of diethylaminoethanol, and/or (meth)acrylic esters with dimethylaminoethanol, and (meth) acrylic esters with dihydric aliphatic alcohols of chain length $C_2$-$C_{18}$, in which only one alcohol group is esterified. Additionally suitable are amides of ethylenically unsaturated carboxylic acids such as amides of acrylic acid and methacrylic acid, and N-methylolamides of acrylic acid and methacrylic acid, and ethers thereof. A further group of these monomers is that of N-vinylamides including the N-vinyllactams, for example vinylpyrrolidone or N-vinyl-N-methylacetamide.

Suitable comonomers A5 with stabilizing ionic groups are ethylenically unsaturated carboxylic acids or sulfonic acids which have one or two carboxyl groups or a sulfonic acid group. Instead of the free acids, it is also possible to use their salts, preferably alkali metal or ammonium salts.

Examples thereof are acrylic acid, methacrylic acid, crotonic acid, maleic acid, fumaric acid, itaconic acid, vinylsulfonic acid, styrenesulfonic acid, monoesters of maleic acid, of fumaric acid and/or of itaconic acid with monohydric aliphatic saturated alcohols of chain length $C_1$-$C_{18}$, and their alkali metal and ammonium salts, or (meth)acrylic esters of sulfoalkanols, for example sodium 2-sulfoethylmethacrylate.

Particularly preferred type A5 comonomers are acrylic acid, methacrylic acid, crotonic acid, itaconic and/or vinylsulfonic acid.

The amount of any further comonomers A5 present, if appropriate in combination with further comonomers from this monomer group, is preferably up to 5% by weight, especially up to 3% by weight, based on the total amount of monomers used in step i).

The type A6 monomers are any further ethylenically unsaturated compounds which do not belong to the type A1 to A5 monomers and are readily or less readily copolymerizable with the type A1 to A5 monomers. Examples of type A6 monomers are esters of saturated aliphatic monocarboxylic acids with monohydric unsaturated alcohols of chain length $C_3$-$C_{18}$, esters of ethylenically unsaturated mono- or dicarboxylic acids, especially of acrylic acid and/or methacrylic acid, with monohydric aliphatic saturated alcohols; halogenated olefins such as vinyl chloride, vinylidene chloride and/or tetrafluoroethylene; ethylenically unsaturated nitriles such as acrylonitrile and/or methacrylonitrile; polyethylenically unsaturated, optionally halogenated hydrocarbons, such as butadiene, 2-chlorobutadiene, 2,3-dichlorobutadiene and/or isoprene; $C_9$-$C_{16}$ alpha-olefins; vinylaromatics such as styrene; vinyl ethers of monohydric aliphatic saturated alcohols of chain length $C_1$-$C_{18}$; divinyl and/or diallyl esters of saturated and unsaturated aliphatic dicarboxylic acids of chain length $C_3$-$C_{18}$; vinyl and allyl esters of acrylic acid and crotonic acid, and triallyl cyanurate.

The amount of any further comonomers A6 present, optionally in combination with further comonomers from this monomer group, is typically up to 10% by weight, preferably up to 8% by weight, based on all of the monomers present in step i).

The type A7 monomers are a subgroup of the type A6 monomers which can be used in step ii) of the process according to the invention. Type A7 monomers can be copolymerized with vinyl esters of saturated carboxylic acids only with difficulty. The type A7 monomers include esters of ethylenically unsaturated monocarboxylic acids with monohydric aliphatic saturated alcohols, diesters of ethylenically unsaturated dicarboxylic acids with monohydric aliphatic saturated alcohols and/or vinylaromatics.

The type A7 monomers are used in step ii) of the above-described process preferably alone or in the form of mixtures of monomers of this group, optionally in combination with type A4 and/or A5 monomers.

In a further preferred variant of the above-described process, the type A3 monomers are used in step ii) alone or in the form of mixtures of monomers of this group, optionally in combination with type A4 and/or A5 monomers.

Particular preference is given to using multistage polyvinyl ester dispersions which comprise a polymer which is obtained by multistage copolymerization and has structural units which derive from vinyl esters of $C_5$-$C_{18}$ carboxylic acids, acrylates, methacrylates, acrylamides, methacrylamides, bisesters of maleic acid with $C_1$-$C_{18}$ alcohols, bisesters of fumaric acid with $C_1$-$C_{18}$ alcohols and/or vinylaromatics, more preferably from vinyl esters of $C_5$-$C_{18}$ carboxylic acids, esters of acrylic acid and/or of methacrylic acid with $C_1$-$C_{18}$ alcohols, styrene and/or α-methylstyrene.

Particular preference is likewise given to using multistage polyvinyl ester dispersions comprising a polymer which is obtained by multistage copolymerization and has structural units which derive from vinyl esters of straight-chain or branched $C_1$-$C_{18}$ carboxylic acids, preferably from vinyl acetate and optionally from further vinyl esters of branched and saturated $C_5$-$C_{12}$ carboxylic acids and/or from α-olefins, most preferably from vinyl acetate and ethylene.

Very particular preference is given to using multistage polyvinyl ester dispersions comprising one or more polymers which are obtained by multistage copolymerization and have structural units which derive from vinyl acetate and ethylene, and also structural units derived from acrylate and/or methacrylate and/or vinyl esters of a branched and saturated $C_5$-$C_{12}$ carboxylic acid.

Very particular preference is likewise given to using multistage polyvinyl ester dispersions comprising one or more polymers which are obtained by multistage copolymerization and have structural units which derive from at least one vinyl ester of a branched and saturated $C_1$-$C_{18}$ carboxylic acid, and from at least one vinylaromatic.

Very particular preference is likewise given to using multistage polyvinyl ester dispersions comprising one or more polymers which are obtained by multistage copolymerization and have structural units which derive from at least one monomer selected from the group of the monomers containing ethylenically unsaturated silane groups, the monomers containing ethylenically unsaturated epoxide groups, the monomers containing ethylenically unsaturated carboxylic acid, sulfonic acid, phosphoric acid or phosphonic acid groups or salts thereof, or the mixtures of at least two of these monomers.

The multistage polyvinyl ester dispersions used in accordance with the invention comprise at least one protective colloid and/or comprise at least one emulsifier. Preferably only protective colloid, or protective colloid and up to 3.65% by weight of emulsifier, are present.

Suitable protective colloids, i.e. polymeric stabilizers, are methylcelluloses, hydroxyethyl- and propylcelluloses, and also sodium carboxymethylcellulose, gelatin, casein, starch, gum arabic, hydroxyethyl starch and sodium alginate.

The preferred protective colloid is polyvinyl alcohol. Suitable polyvinyl alcohol has degrees of hydrolysis of from 60 to 100 mol % and viscosities of the 4% aqueous solutions at 20° C. of 2-70 mPa*s, especially from 30 to 70 mPa*s.

The protective colloids mentioned can of course also be used in the form of mixtures.

When protective colloids are used, the amount thereof, based on the total amount of monomers used, is typically from 0.1 to 5 parts by weight, preferably from 0.3 to 5 parts by weight.

In a preferred variant, the inventive coating compositions contain no protective colloid at all, or the amount of protective colloid, based on the total amount of monomers used, is less than 1% by weight, more preferably less than 0.7% by weight.

The emulsifiers used are generally nonionic emulsifiers or combinations of nonionic with ionic emulsifiers.

Examples of nonionic emulsifiers are acyl, alkyl, oleyl and alkylaryl ethoxylates. These products are, for example, commercially available under the name Genapol® or Lutensol®. They include, for example, ethoxylated mono-, di- and tri-alkylphenols (EO: from 3 to 50, alkyl substituted radical: $C_4$ to $C_{12}$) and ethoxylated fatty alcohols (EO: from 3 to 80; alkyl radical: $C_8$ to $C_{36}$), especially $C_{12}$-$C_{14}$-fatty alcohol (3-8) ethoxylates, $C_{13}C_{15}$-oxo alcohol (3-30) ethoxylates, $C_{16}C_{18}$-fatty alcohol (11-80) ethoxylates, $C_{1-10}$-oxo alcohol (3-11) ethoxylates, $C_{1-3}$-oxo alcohol (3-20) ethoxylates, polyoxyethylene sorbitan monooleate with 20 ethylene oxide groups, copolymers of ethylene oxide and propylene oxide with a minimum content of 10% by weight of ethylene oxide, the polyethylene oxide (4-20) ethers of oleyl alcohol and the polyethylene oxide (4-20) ethers of nonylphenol. Particularly suitable are the polyethylene oxide (4-20) ethers of fatty alcohols, especially of oleyl alcohol.

When nonionic emulsifiers are used, the amount thereof, based on the total amount of monomers used, is typically from 0.05 to 10 parts by weight, preferably from 0.05 to 5.0 parts by weight, more preferably from 0.05 to 3.65 parts by weight and most preferably from 0.1 to 1 part by weight. It is also possible to use mixtures of nonionic emulsifiers.

Instead of or in addition to nonionic emulsifiers, it is possible to use ionic emulsifiers, preferably anionic emulsifiers. Examples include sodium, potassium and ammonium salts of straight-chain aliphatic carboxylic acids of chain length $C_{12}$-$C_{20}$, sodium hydroxyoctadecanesulfonate, sodium, potassium and ammonium salts of hydroxy fatty acids of chain length $C_{12}$-$C_{20}$ and their sulfation and/or acetylation products thereof, alkyl sulfates, also in the form of triethanolamine salts, alkyl-($C_{10}$-$C_{20}$)-sulfonates, alkyl-($C_{10}$-$C_{20}$)-arylsulfonates, dimethyldialkyl-($C_8$-$C_{18}$)-ammonium chloride, and sulfation products thereof, alkali metal salts of sulfosuccinic esters with aliphatic saturated monohydric alcohols of chain length $C_4$-$C_{16}$, sulfosuccinic 4-esters with polyethylene glycol ethers of monohydric aliphatic alcohols of chain length $C_{10}$-$C_{12}$ (disodium salt), sulfosuccinic 4-esters with polyethylene glycol nonylphenyl ether (disodium salt), sulfosuccinic acid biscyclohexyl ester (sodium salt), lignosulfonic acid and the calcium, magnesium, sodium and ammonium salts thereof, resin acids, hydrogenated and dehydrogenated resin acids and alkali metal salts thereof, sodium (dodecylated diphenyl ether) disulfonate and sodium laurylsulfate, or ethoxylated sodium lauryl ether sulfate (3 EO). It is also possible to use mixtures of ionic emulsifiers.

When ionic emulsifiers are used, the amount thereof, based on the total amount of monomers used, is typically from 0.05 to 10 parts by weight, preferably from 0.05 to 5.0 parts by weight, more preferably from 0.05 to 3.65 parts by weight and most preferably from 0.1 to 1 part by weight. It is also possible to use mixtures of ionic emulsifiers.

When emulsifiers are used, the total amount thereof, based on the total amount of the monomers used, is typically from 0.05 to 10 parts by weight, preferably from 0.05 to 5.0 parts by weight, more preferably from 0.05 to 3.65 parts by weight and most preferably from 0.1 to 1 part by weight.

The aqueous multistage polyvinyl ester dispersions used in accordance with the invention typically have solids contents of from 20 to 70% by weight, preferably from 30 to 65% by weight and more preferably from 40 to 60% by weight.

The pH of the multistage polyvinyl ester dispersions used in accordance with the invention is typically between 2 and 7, preferably between 2.5 and 6.

The multistage polyvinyl ester dispersions used in accordance with the invention can be prepared by the above-described process.

This is a free-radical emulsion polymerization which has been modified by a selected step ii).

The free-radical emulsion polymerization in step i) can be carried out in a manner known per se in a batchwise process, in a feed process, in a combined batchwise/feed process or in a continuous process.

In step i), preference is given to working in a combined batchwise/feed process and particular preference to working in a feed process, in which case an amount of the monomers used in step i), for example from 1 to 15% by weight, is typically initially charged to start the polymerization. The monomers can be metered in either together or in separate feeds. In addition, it may be advantageous in particular embodiments to establish specific particle sizes and particle size distributions at the start of step i) by performing a seed polymerization.

The emulsifier and/or the protective colloid also used for stabilization can be initially charged completely at the start of step i), or can be initially charged in part and metered in part, or can be metered in completely during the performance of step i).

The polymerization temperature during step i) varies typically within the range from 20 to 120° C., preferably within the range from 30 to 110° C. and most preferably within the range from 45 to 95° C.

To start the polymerization, the initiators of free-radical polymerization known per se can be used. Examples thereof are hydrogen peroxide, benzoyl peroxide, cyclohexanone peroxide, isopropylcumyl hydroperoxide, persulfates of potassium, sodium and ammonium, peroxides of even-numbered saturated monobasic aliphatic carboxylic acids of chain length $C_8$-$C_{12}$, tert-butyl hydroperoxide, di-tert-butyl peroxide, diisopropyl percarbonate, azoisobutyronitrile, acetylcyclohexanesulfonyl peroxide, tert-butyl perbenzoate, tert-butyl peroctoate, bis(3,5,5-trimethyl)hexanoyl peroxide, tert-butyl perpivalate, hydroperoxypinane, p-menthane hydroperoxide. The aforementioned compounds can also be used within a redox system, in which case it is also possible to use transition metal salts such as iron(II) salts, or other reducing agents. The reducing agents or regulators used may also be alkali metal salts of oxymethanesulfinic acid, mercaptans of chain length $C_{10}$-$C_{14}$, buten-(I)-ol-(3), hydroxylamine salts, sodium dialkyldithiocarbamate, sodium bisulfite, ammonium bisulfite, sodium dithionite, diisopropylxanthogen disulfide, ascorbic acid, tartaric acid, isoascorbic acid, boric acid, urea and formic acid.

However, preference is given to using water-soluble persulfates, especially ammonium persulfate or sodium persulfate, to initiate the polymerization.

The initiator for the polymerization used in step i) can be added completely to the reaction mixture at the start of step i) or can be added in part or metered in part in the course of step i) or can be metered in completely during the performance of step i).

After the complete or virtually complete conversion of at least 90%, preferably at least 95%, of the monomers used in step i), step ii) is commenced.

To this end, the entire amount of the monomers provided for the next stage of the polymerization process is added in pure form, in the form of a solution or in the form of a monomer emulsion to the polymerization mixture obtained in step i). In this step too, the monomers can be metered in either together or in separate feeds. The duration for the addition varies typically within the range from 5 to 60 minutes, preferably from 15 to 30 minutes.

In step ii), further emulsifier and/or further protective colloid can be initially charged completely at the start of step ii) or, during step ii) and if appropriate during step iii), can be initially charged in part and metered in part, or can be metered in completely during the performance of steps ii) and if appropriate iii).

The temperature of the reaction mixture during step ii) may vary within the range of the temperature at the end of step i); the temperature during step ii) is preferably lowered by up to 40° C. compared to the temperature at the end of step i).

The monomers are added to the reaction mixture in step ii) in pure form or in the form of solutions in organic solvents or in the form of an emulsion, especially an aqueous emulsion. Preference is given to adding the monomers to the reaction mixture in liquid and pure form.

After the addition of the monomers in step ii), step iii) is commenced by adding the initiator. This can be done immediately after step ii) has ended or after a rest phase of, for example, from 15 to 120 minutes. It is assumed that the monomers supplied in step ii) can be distributed in or on the polymer particles formed in the first stage during the performance of step ii) and within any rest phase which follows.

To restart the polymerization in step iii) of the process, the initiators of free-radical polymerization known per se can be used. Examples thereof are listed above in the description of step i).

In this case too, the initiator for the polymerization used in step iii) can be added completely to the reaction mixture at the start of step iii) or can be added in part and metered in part in the course of step iii) or can be metered in completely during the performance of step iii).

The polymerization temperature during step iii) varies typically within the range from 20 to 120° C., preferably within the range from 30 to 110° C. and most preferably within the range from 45 to 95° C.

Before starting the second stage of the polymerization, it is advisable to increase the temperature of the reaction mixture before or during the addition of the initiator.

On completion of step iii), for demonomerization, a further, preferably chemical aftertreatment, especially with redox catalysts, for example combinations of the abovementioned oxidizing agents and reducing agents, may follow. In addition, residual monomer present can be removed in a known manner, for example by physical demonomerization, i.e. distillative removal, especially by means of steam distillation, or by stripping with an inert gas. A particularly efficient combination is one of physical and chemical methods, which permits lowering of the residual monomers to very low contents (<1000 ppm, preferably <100 ppm).

The aqueous multistage polyvinyl ester dispersions described here can be used as binders for coating compositions of all kinds. Particular preference is given to using these as sole binders.

The proportion of multistage polyvinyl ester dispersion in the inventive coating composition is typically from 5 to 50% by weight, preferably from 10 to 50% by weight, more preferably from 15 to 30% by weight, based on the total solids content.

The inventive coating compositions are used, for example, as synthetic resin-bound plasters, paste-form tile adhesives, paste-form sealants and paste-form sealing compositions, preferably for porous components, and as papercoating slips, but especially as paints, for example emulsion paints, other emulsion coatings and glazes.

The above-described coating compositions comprise the binder generally as the sole binder. This means that these coating compositions comprise only small amounts, if any, of hydraulically setting materials.

Particular preference is given to using the inventive coating compositions as roof coatings, as façade paints or as interior paints.

The invention also relates to these uses.

The inventive coating compositions can be used, directly or after addition of rheology-modifying additives and/or of further components, as formulations for coating substrates. Such formulations are, for example, primers or clearcoats.

A preferred embodiment of the formulations is that of emulsion paints. These comprise generally from 30 to 75% by weight, preferably from 40 to 65% by weight, of nonvolatile constituents. This should be understood to mean all constituents of the emulsion paint apart from water and any hydrocarbons present, for example the total amount of solid binder, filler, pigment, plasticizer, binder (solids content) and polymeric assistant.

The nonvolatile constituents are accounted for preferably by
a) from 3 to 90% by weight, more preferably from 10 to 60% by weight, of the polyvinyl ester dispersion, where the amounts are based on the solids,
b) from 5 to 85% by weight, more preferably from 10 to 60% by weight, of at least one inorganic pigment,
c) from 0 to 85% by weight, more preferably from 20 to 70% by weight, of inorganic fillers, and
d) from 0.1 to 40% by weight, more preferably from 0.5 to 15% by weight, of customary assistants.

Particular preference is given to solvent- and plasticizer-free, aqueous coating compositions.

The pigment volume concentration (PVK) of inventive pigment-containing coating compositions is generally above 5%, preferably in the range from 10 to 90%.

All pigments known to those skilled in the art for the end uses mentioned can be used. Preference is given to titanium dioxide, preferably in the rutile form, barium sulfate, zinc oxide, zinc sulfide, basic lead carbonate, antimony trioxide and lithopone (zinc sulfide and barium sulfate). The coating compositions may, however, also comprise colored pigments, for example iron oxides, carbon black, graphite, luminescent pigments, zinc yellow, zinc green, ultramarine, manganese black, antimony black, manganese violet, Paris blue or Schweinfurter green. In addition to the inorganic pigments, the inventive coating compositions may also comprise organic color pigments, for example sepia, gamboge, Cassel brown, toluidine red, Para red, Hansa yellow, indigo, azo dyes, anthraquinoid and indigoid dyes, and also dioxazine, quinacridone, phthalocyanine, isoindolinone and metal complex pigments.

The fillers used may be all fillers known to those skilled in the art for the end use mentioned. Preferred fillers are aluminosilicates, for example feldspars, silicates, for example kaolin, talc, mica, china clays, magnesite, alkaline earth metal carbonates, for example calcium carbonate, for example in the form of calcite or chalk, magnesium carbonate, dolomite, alkaline earth metal sulfates, for example calcium sulfate, and silicon dioxide. The fillers can be used either as individual components or as filler mixtures. Preference is given in practice to filler mixtures, for example calcium carbonate/kaolin and calcium carbonate/talc. Synthetic resin-bound plasters may also comprise coarser additives, such as sands or sandstone granules. In general, fine fillers are preferred in emulsion paints.

To increase the hiding power and to save white pigments, fine fillers are frequently used with preference with emulsion paints, for example precipitated calcium carbonate or mixtures of different calcium carbonates with different particle sizes. To adjust the hiding power of the shade and the depth of color, preference is given to using blends of color pigments and fillers.

The customary assistants include wetting agents or dispersants, such as sodium, potassium or ammonium polyphosphates, alkali metal and ammonium salts of polyacrylic acids and of polymaleic acid, polyphosphonates such as sodium 1-hydroxyethane-1,1-diphosphonate, and also naphthalenesulfonic acid salts, especially sodium salts thereof. The dispersants used may additionally be suitable amino alcohols, for example 2-amino-2-methylpropanol. The dispersants and wetting agents are preferably used in an amount of from 0.1 to 2% by weight, based on the total weight of the coating composition.

In addition, the assistants may also include thickeners, for example cellulose derivatives, such as methylcellulose, hydroxyethylcellulose and carboxymethylcellulose, and also casein, gum arabic, gum tragacanth, starch, sodium alginate, polyvinyl alcohol, polyvinylpyrrolidone, sodium polyacrylates, water-soluble copolymers based on acrylic and (meth) acrylic acid, such as acrylic acid/acrylamide and (meth) acrylic acid/acrylic ester copolymers, and so-called associative thickeners such as styrene-maleic anhydride polymers or, preferably, hydrophobically modified polyether urethanes (HEUR), hydrophobically modified acrylic acid copolymers (HASE) and polyether polyols, all of which are known to those skilled in the art.

It is also possible to use inorganic thickeners, for example bentonites or hectorite.

When thickeners are present, they are preferably used in amounts of from 0.1 to 3% by weight, more preferably from 0.1 to 1% by weight, based on the total weight of the coating composition.

The inventive coating compositions may also comprise crosslinking additives. Such additives may be: aromatic ketones, for example alkyl phenyl ketones, which may have one or more substituents on the phenyl ring, or benzophenone and substituted benzophenones as photoinitiators. Photoinitiators suitable for this purpose are disclosed, for example, in DE-A-38 27 975 and EP-A-0 417 568. Suitable crosslinking compounds are also water-soluble compounds having at least two amino groups, for example dihydrazides of aliphatic dicarboxylic acids, as disclosed, for example, in DE-A-39 01 073, when the vinyl ester copolymer P contains monomers containing carbonyl groups in copolymerized form.

It addition, it is possible to use, in the inventive coating compositions, as further assistants, also waxes based on paraffins and polyethylene, and matting agents, defoamers, preservatives or hydrophobicizing agents, UV stabilizers, biocides, fibers, plasticizers and further additives known to those skilled in the art. Examples of plasticizers are dimethyl phthalate, diisobutyl phthalate, diisobutyl adipate, Coasol B® and Plastilit 3060®. Examples of defoamers are mineral oil defoamers or silicone defoamers. Examples of UV stabilizers are sterically hindered piperidine compounds (HALS) or benzophenone derivatives.

The above-described multistage polyvinyl ester dispersions may, as well as solvent- and plasticizer-free coating compositions, of course also be used to produce coating compositions which comprise solvents and/or plasticizers. Such film-forming assistants are common knowledge to the person skilled in the art and can be used typically in amounts of from 0.1 to 20% by weight, based on the polyvinyl ester derivative present in the formulation, such that the formulation has a minimum film formation temperature of less than 15° C., preferably in the range from 0 to 10° C. Examples thereof are petroleum spirit, Texanol®, TxiB®, butylglycol, butyldiglycol, butyldipropylene glycol and butyltripropylene glycol.

The inventive coating compositions are stable fluid systems which can be used to coat a multitude of substrates. Suitable substrates are, for example, wood, concrete, metal, glass, ceramics, plastic, plasters, wallpaper, other paper, or painted, primed or weathered substrates. The coating composition is applied to the substrate to be coated in a manner dependent on the configuration of the coating composition. The application can, depending on the viscosity and the pigment content of the formulation and on the substrate, be effected by means of rolling, brushing, knife coating, dipping or as a spray.

The films obtained from the inventive coating compositions exhibit, surprisingly, an exceptionally high weathering resistance, comparable to emulsion paints comprising binders based on straight acrylate.

The examples which follow serve to illustrate the invention. The parts and percentages reported in the examples are based on the weight, unless stated otherwise.

COMPARATIVE EXAMPLE C1

Preparation of a Dispersion of a Vinyl Acetate-Ethylene Copolymer by Conventional Copolymerization A pressure apparatus with stirrer, jacket heater and metering pumps was charged with an aqueous solution consisting of the following constituents:

21 525 g of water, 86 g of sodium acetate, 1440 g of a 70% by weight aqueous solution of an oxoalkyl ethoxylate with 28 mol of ethylene oxide, 2167 g of a 10% by weight aqueous polyvinyl alcohol solution (viscosity of the 4% by weight aqueous solution 23 mPa*s), 1127 g of a 15% by weight sodium laurylsulfate solution, 577 g of a 30% by weight aqueous sodium vinylsulfonate solution and 8 g of 1% by weight aqueous solution of $Fe(II)((SO_4) \times 7H_2O$. The pH of the solution was 7.2. The apparatus was freed of atmospheric oxygen and ethylene was injected into the apparatus up to ethylene pressure 20 bar. 1640 g of vinyl acetate were then metered in. The apparatus was heated to internal temperature 60° C. At 35° C., 10% of a solution of 30 g of Brüggolit C in 2215 g of water were metered in. Subsequently, 10% of a solution of 42.8 g of 70% by weight aqueous t-butyl hydroperoxide in 2215 g of water were metered in, in the course of which the internal temperature rose to 60° C. and the heat of reaction was removed by cooling. A mixture of 31 065 g of vinyl acetate and 72 g of vinyltrimethoxysilane (VTM) was metered in, in the course of which the ethylene pressure was kept at 40 bar until 1725 g of ethylene were in the reactor. At the same time, the remaining 90% of the reduction and initiator solution were metered in at internal temperature 60° C.

Thereafter, a solution of 36 g of sodium peroxodisulfate in 600 g of water was metered in and the internal temperature was increased to 80° C. and kept at this temperature for 1 hour.

EXAMPLE 1

Preparation of a Dispersion of a Vinyl Acetate-Ethylene Copolymer Modified with Methyl Methacrylate by Inclusion Polymerization (5 GT MMA)

A pressure apparatus with stirrer, jacket heater and metering pumps was charged with an aqueous solution consisting of the following constituents:

Amount of water A (20 200 g), 74 g of sodium acetate, 1240 g of a 70% by weight aqueous solution of an oxoalkyl ethoxylate with 28 mol of ethylene oxide, 1860 g of a 10% by weight aqueous polyvinyl alcohol solution (viscosity of the 4% by weight aqueous solution 23 mPa*s), 970 g of a 15% by weight sodium laurylsulfate solution, 500 g of a 30% by weight aqueous sodium vinylsulfonate solution and 7 g of a 1% by weight aqueous solution of $Fe(II)((SO_4) \times 7H_2O$. The pH of the solution was 7.2. The apparatus was freed of atmospheric oxygen and ethylene was injected into the apparatus up to ethylene pressure 20 bar. 1390 g of vinyl acetate were then metered in. The apparatus was heated to internal temperature 60° C. At 35° C., 10% of a solution of 26 g of Brüggolit C in 1900 g of water was metered in. Subsequently, 10% of a solution of 37 g of 70% by weight aqueous t-butyl hydroperoxide in 1900 g of water was metered in, in the course of which the internal temperature rose to 60° C. and the heat of reaction was removed by cooling. A mixture of 26 740 g of vinyl acetate and 62 g of vinyltrimethoxysilane (VTM) was metered in, in the course of which the ethylene pressure was kept at 40 bar until 1483 g of ethylene were in the reactor. At the same time, the remaining 90% of the reduction and initiator solution were metered in at internal temperature 60° C.

Thereafter, the internal temperature was increased to 80° C. and kept at this temperature for 1 hour. Subsequently, the mixture was cooled to 50° C., amount of methyl methacrylate B (1480 g) was metered in and the internal temperature was kept at 50° C. for a further hour. The mixture was now heated to internal temperature 85° C. and a solution of 14.8 g of sodium peroxodisulfate in 590 g of water was metered in. The internal temperature was kept at 85° C. for a further hour and then cooled.

According to this preparation method, three further example dispersions 2, 3 and 4 with the following amounts of water A and amounts of methyl methacrylate B according to Table 1 below were prepared. Some properties of the dispersions of Examples C1 and 1-4 are shown in Table 2.

TABLE 1

| | Amount of water A | Amount of methyl methacrylate B |
|---|---|---|
| Example 2, 10 GT MMA | 21 400 g | 2970 g |
| Example 3, 15 GT MMA | 22 700 g | 4450 g |
| Example 4, 20 GT MMA | 23 900 g | 5930 g |

TABLE 2

| Example No. | Solids content (%) | MFT (° C.) | $T_g$ (° C.) | Screen residue (%) | Aerosol $d_w$ [1] (nm) | Aerosol $d_w/d_n$ [2] | pH | Contact angle [3] |
|---|---|---|---|---|---|---|---|---|
| CE1 | 54.2 | 11.0 | 29.0 | 0.012 | 173 | 1.34 | 4.5 | 33 |
| 1 | 53.5 | 9.0 | 30.4 | 0.007 | 185 | 1.38 | 4.3 | 36 |
| 2 | 53.2 | 11.0 | 29.6 | 0.0056 | 196 | 1.43 | 4.2 | 39 |

TABLE 2-continued

| Example No. | Solids content (%) | MFT (°C.) | $T_g$ (°C.) | Screen residue (%) | Aerosol $d_w$ [1] (nm) | Aerosol $d_w/d_n$ [2] | pH | Contact angle [3] |
|---|---|---|---|---|---|---|---|---|
| 3 | 53.5 | 12.0 | 32.2 | 0.0062 | 192 | 1.41 | 4.2 | 40 |
| 4 | 53.4 | 13.0 | 33.0 | 0.0034 | 198 | 1.36 | 4.2 | 42 |

[1] Weight-average particle diameter (determined by aerosol spectroscopy)
[2] Ratio of weight-average to number-average particle diameter (determined by aerosol spectroscopy)
[3] Contact angle of the film obtained from the dispersion with respect to water.

COMPARATIVE EXAMPLE C2

Preparation of a Vinyl Acetate-Ethylene Copolymer Dispersion by Conventional Multistage Copolymerization A pressure apparatus with stirrer, jacket heater and metering pumps was charged with an aqueous solution consisting of the following constituents:

18 813 g of water, 84.2 g of sodium acetate, 5033 g of a 20% by weight aqueous solution of a nonylphenol ethoxylate with 30 mol of ethylene oxide, 67.1 g of sodium laurylsulfate, 2013 g of a 10% by weight aqueous polyvinyl alcohol solution (viscosity of the 4% by weight aqueous solution 23 mPa*s), 566 g of a 30% by weight aqueous sodium vinylsulfonate solution and 33 g of 1% by weight aqueous solution of Fe(II)(($SO_4$)×$7H_2O$. The pH of the solution was 7.2. The apparatus was freed of atmospheric oxygen and 335 g of ethylene were injected into the apparatus and the ethylene supply was closed. At room temperature, 30% of monomer mixture B and 2.63 g of Brüggolit E01 dissolved in 194 g of water were metered in. The mixture was heated to internal temperatures 60° C. and a solution of 3.75 g of 70% aqueous tert-butyl hydroperoxide solution in 194 g of water was metered in 50° C. The heat of reaction was removed by cooling. On attainment of 60° C., 70% of monomer mixture B were metered in within 90 minutes, as were 26.6 g of Brüggolit E01 dissolved in 1964 g of water within 360 minutes and a solution of 38 g of 70% aqueous tert-butyl hydroperoxide solution in 1964 g of water within 360 minutes. After the metered addition of monomer mixture B had ended, monomer mixture A was metered in within 270 minutes and, by opening the ethylene supply, the internal vessel pressure was increased to 40 bar, and the ethylene supply remained open at this pressure until a further 3020 g of ethylene had been metered in. After the metered addition of monomer mixture A had ended, a solution of 33.6 g of sodium persulfate in 792 g of water was metered in and the internal temperature was increased to 80° C. and kept at this temperature for 1 hour. With stirring, the majority of the unconverted ethylene was then outgassed and 2 l of water were added. While applying reduced pressure, 2 l of water were then distilled off within 2 hours, which reduced the residue vinyl acetate content of the dispersion to 0.05% by weight, based on the dispersion.

The monomer mixture B used was 9681 g of vinyl acetate and 134.2 g of vinyltrimethoxysilane.

The monomer mixture A used was 20 385 g of vinyl acetate.

EXAMPLE 5

Preparation of a Dispersion of a Vinyl Acetate-Ethylene Copolymer Modified with Methyl Methacrylate by Inclusion Polymerization (5 GT MMA)

A pressure apparatus with stirrer, jacket heater and metering pumps was charged with an aqueous solution consisting of the following constituents:

Amount of water A (17 700 g), 74.5 g of sodium acetate, 4450 g of a 20% by weight aqueous solution of a nonylphenol ethoxylate with 30 mol of ethylene oxide, 60 g of sodium laurylsulfate, 1780 g of a 10% by weight aqueous polyvinyl alcohol solution (viscosity of the 4% by weight aqueous solution 23 mPa*s), 500 g of a 30% by weight aqueous sodium vinylsulfonate solution and 30 g of a 1% by weight aqueous solution of Fe(II)(($SO_4$)×$7H_2O$. The pH of the solution was 7.2. The apparatus was freed of atmospheric oxygen and 300 g of ethylene were injected into the apparatus and the ethylene supply is closed. At room temperature, 30% of a monomer mixture consisting of 8570 g of vinyl acetate and 119 g of vinyltrimethoxysilane, then 2.3 g of Brüggolit E01 dissolved in 172 g of water, were metered in. The mixture was heated to internal temperature 60° C. and, at 50° C., a solution of 3.3 g of 70% aqueous tert-butyl hydroperoxide solution in 172 g of water was metered in. The heat of reaction was removed by cooling. On attainment of 60° C., the remaining 70% of the monomer mixture were metered in within 90 minutes, as were 23.5 g of Brüggolit E01 dissolved in 1737 g of water within 360 minutes and a solution of 33.6 g of 70% aqueous tert-butyl hydroperoxide solution in 1737 g of water within 360 minutes. After the metered addition of the monomer mixture had ended, 18 040 g of Vina were metered in within 270 minutes and, at the same time, by opening the ethylene supply, the internal vessel pressure was increased to 40 bar, and the ethylene supply remained opened at this pressure until a further 2670 g of ethylene had been metered in. Thereafter, the internal temperature was increased to 80° C. and kept at this temperature for 1 hour. Subsequently, the mixture was cooled to 50° C., then amount of methyl methacrylate B (1480 g) was metered in and the internal temperature was kept at 50° C. for a further hour. The mixture was then heated to internal temperature 85° C. and a solution of 14.8 g of sodium peroxodisulfate in 590 g of water was metered in. The internal temperature was kept at 85° C. for a further hour and then cooled.

According to this preparation method, three further example dispersions 6, 7 and 8 with the following amounts of water A and amounts of methyl methacrylate B according to the following Table 3 were prepared. Some properties of the dispersions of Examples C2 and 5-8 are shown in Table 4.

TABLE 3

| | Amount of water A | Amount of methyl methacrylate B |
|---|---|---|
| Example 6, 10 GT MMA | 19 000 g | 2970 g |
| Example 7, 15 GT MMA | 20 200 g | 4450 g |
| Example 8, 20 GT MMA | 21 500 g | 5930 g |

TABLE 4

| Example No. | Solids content (%) | MFT (°C.) | $T_g$ (°C.) | Screen residue (%) | Aerosol $d_w$ [1] (nm) | Aerosol $d_w/d_n$ [2] | PCS $d_w$ [3] (nm) | PCS $d_w/d_n$ [4] |
|---|---|---|---|---|---|---|---|---|
| CE2 | 53.7 | 4 | 24.7 | 0.0067 | 178 | 1.35 | 480 | 1.17 |
| 5 | 53.5 | 6 | 24.6 | 0.0111 | 186 | 1.38 | 452 | 1.14 |
| 6 | 53.5 | 7 | 25.7 | 0.0091 | 183 | 1.37 | 748 | 1.3 |
| 7 | 53.2 | 7 | 26.1 | 0.0075 | 186 | 1.38 | 536 | 1.16 |
| 8 | 53.3 | 9 | 26.6 | 0.0109 | 189 | 1.39 | 1829 | 1.91 |

[1] Weight-average particle diameter (determined by aerosol spectroscopy)
[2] Ratio of weight-average to number-average particle diameter (determined by aerosol spectroscopy)
[3] Weight-average particle diameter (determined by photo correlation spectroscopy).
[4] Ratio of weight-average to number-average particle diameter (determined by photo correlation spectroscopy)

COMPARATIVE EXAMPLE 3

Commercially Available Dispersion Based on Polyacrylate LDM 7717, Celanese Emulsions GmbH Outdoor Weathering Tests with Emulsion Paints The invention is illustrated in detail hereinafter by formulation and study of emulsion paints with the composition according to the following Tables 5 and 6.

TABLE 5

| Constituents | Parts by weight |
|---|---|
| Water | 174.0 |
| Thickener, Tylose MH 4000 KG4 | 2.0 |
| Dispersant, Galgon N | 15.0 |
| Dispersant, Mowiplus XW 330, approx. 30% strength | 3.0 |
| Defoamer based on mineral oil | 4.0 |
| Pigment, titanium dioxide | 225.0 |
| Filler, talc | 40.0 |
| Filler, china clay grade B | 20.0 |
| Filler, Omyacarb 5 GU | 195.0 |
| Ammonia, 20% aq. solution | 2.0 |
| Copolymer dispersion [1] | 302.0 |
| Film formation assistant, butyldiglycol acetate | 8.0 |
| Film formation assistant, Dowanol DPnB | 10.0 |
| Total | 1000.0 |

[1] The dispersions used are listed in Table 6 below.

The pulverulent thickener was scattered into the water and dissolved with stirring, then dispersant and defoamer based on mineral oil were added with stirring. With stirring by means of a dissolver, the pigments and fillers were introduced and dispersed and then, with an increase in the stirrer speed to 5000 rpm, dispersed further at 5000 rpm, in the course of which the temperature of the pigment/filler paste rose to 60° C. The mixture was allowed to cool to 30° C. With gentle stirring, the copolymer dispersion and the film formation assistants were then stirred in.

The specimens for the outdoor weathering were produced as follows: the substrates used were fiber cement panels (20× 50 cm, preweathered). The preweathering was effected by 4×16-hour underwater storage with intermediate drying and cleaning. The fiber cement panels were primed and the emulsion paint was applied in a laboratory at room temperature twice the substrate in each case. Intermediate drying was effected for 8 hours in each case.

For the weathering test, the specimens, after drying in the laboratory for 48 hours, were laid out in the outdoor weathering test at an angle of 90° from the southerly direction in Istanbul. To assess the weathering stability, the shade stability was employed. To this end, the L, a and b values were determined to DIN 6174 with a color guide spectrophotometer (from Byk-Gardner).

TABLE 6

| Copolymer dispersion according to | L-start | L-9 months | Delta-L-9 months | L-12 months | Delta-L-12 months |
|---|---|---|---|---|---|
| Comparative Example 1 | 96.26 | 90.46 | 5.8 | 89.1 | 7.16 |
| Example 2 | 96.29 | 92.03 | 4.26 | 90.45 | 5.84 |
| Example 4 | 96.36 | 92.16 | 4.2 | 90.9 | 5.46 |
| Comparative Example 2 | 96.25 | 91.14 | 5.11 | 89.7 | 6.55 |
| Example 6 | 96.44 | 92.3 | 4.14 | 90.92 | 5.52 |
| Example 8 | 96.26 | 92.92 | 3.34 | 91.96 | 4.3 |
| Comparative Example 3 | 96.35 | 92.34 | 4.01 | 91.02 | 5.33 |

Table 6 shows the L values after 9 and 12 months of outdoor weathering. In addition, the delta-L value was reported. This is calculated as the difference between the L value after outdoor weathering and the zero value (start value). The smaller the delta-L values are, the smaller is the change in brightness compared to the start value and, therefore, the higher the weathering resistance is.

The invention claimed is:

1. A coating composition comprising a multistage polyvinyl ester dispersion, wherein the multistage polyvinyl ester dispersion is produced by a method comprising
   i) polymerizing in a first stage a polymerization mixture comprising at least one vinyl ester of a saturated carboxylic acid and optionally further monomers copolymerizable therewith in the presence of at least one emulsifier up to a conversion of at least 90% of the monomers used,
   ii) adding in a second stage to the polymerization mixture obtained in the first stage at least one free-radically polymerizable monomer other than the vinyl ester used in the first stage the at least one free-radically polymerizable monomer selected from the group consisting of an acrylate, a methacrylate, an acrylamide, a methacrylamide, a diester of maleic acid with a $C_1$-$C_{18}$ alcohol, a diester of fumaric acid with a $C_1$-$C_{18}$ alcohol, and a vinylaromatic, with the proviso that a vinyl ester of a carboxylic acid is not added in the second stage with the at least one free-radically polymerizable monomer, wherein the at least one free-radically polymerizable monomer is added in pure form, in the form of a solution or in the form of an emulsion, and with the proviso that the at least one free-radically polymerizable monomer is added at a temperature that is lower than the temperature of the polymerization mixture at the end of the first stage, iii) adding in a third stage after termination of the second stage at least one free-radical polymerization initiator, and iv) adding a pigment, a filler, or a combination thereof, wherein v) the coating composition does not contain a protective colloid, and vi) the coating composition does not include hydraulically setting materials.

2. The coating composition as claimed in claim 1, wherein the multi-stage polyvinyl ester dispersion has a content of emulsifier(s) of up to 5% by weight, based on the total mass of monomers used.

3. The coating composition as claimed in claim 1, wherein the at least one vinyl ester of a saturated carboxylic acid comprises vinyl acetate.

4. The coating composition as claimed in claim 3, wherein the at least one free-radically polymerizable monomer is an acrylate, a methacrylate or a mixture thereof.

5. The coating composition as claimed in claim 3, wherein the vinyl acetate is copolymerized with an α-olefin in the first stage.

6. The coating composition as claimed in claim 1, wherein the vinyl ester of a saturated carboxylic acid comprises vinyl acetate and wherein the vinyl acetate is copolymerized with ethylene in the first stage and wherein the at least one free-radically polymerizable monomer is an acrylate, a methacrylate, or a mixture thereof.

7. A substrate coated with the coating composition of claim 1.

8. The substrate as claimed in claim 7, wherein the coating composition is a synthetic resin-bound plaster, a paste-form tile adhesive, a paste-form sealant, a paste-form sealing composition, a paper coating slip, or a paint.

9. The substrate as claimed in claim 8, wherein the paint is an emulsion paint, an emulsion coating, or a glaze.

10. The substrate as claimed in claim 7, wherein the substrate is a roof or a façade.

11. The coating composition as claimed in claim 1, wherein a film constructed from the coating composition comprises low reemulsifiability or no reemuisifiability.

12. The coating composition as claimed in claim 1, wherein at least one monomer containing an ethylenically unsaturated silane group or at least one ethylenically unsaturated epoxide compound is proivided in the polymerization mixture in the stage, is added in the second stage, or both.

13. A coating composition comprising a multistage polyvinyl ester dispersion, wherein the multistage polyvinyl ester dispersion is produced by a method comprising i) polymerizing in a first stage a polymerization mixture comprising at least one vinyl ester of a saturated carboxylic acid and optionally further monomers copolymerizable therewith in the presence of at least one emulsifier, at least one protective colloid, or mixtures thereof up to a conversion of at least 90% of the monomers used, ii) adding in a second stage to the polymerization mixture obtained in the first stage at least one free-radically polymerizable monomer other than the vinyl ester used in the first stage, the at least one free-radically polymerizable monomer selected from the group consisting of an acrylate, a methacrylate, an acrylamide, a methacrylamide, a diester of maleic acid with a $C_1$-$C_{18}$ alcohol, a diester of fumaric acid with a $C_1$-$C_{18}$ alcohol, and a vinylaromatic, with the proviso that a vinyl ester of a carboxylic acid is not added in the second stage with the at least one free-radically polymerizable monomer, wherein the at least one free-radically polymerizable monomer is added in pure form, in the form of a solution or in the form of an emulsion, and with the proviso that a vinyl ester of a carboxylic acid is not added in the second stage, iii) adding in a third stage after termination of the second stag at least one free-radical polymerization initiator, and iv) adding a pigment, a filler, or a combination thereof, wherein v) the content of protective colloid, based on the total monomer content, is less than 0.7% by weight, and vi) the coating composition does not include hydraulically setting materials.

14. The coating composition as claimed in claim 13, wherein the multistage polyvinyl ester dispersion has a screen residue, based on the multistage polyvinyl ester dispersion and measured with a 40 μm screen, of less than 0.05% by weight.

15. The coating composition as claimed in claim 13, wherein the multi-stage polyvinyl ester dispersion has a content of emulsifier(s) of up to 5% by weight, based on the total mass of monomers used.

16. The coating composition as claimed in claim 13, wherein the multistage polyvinyl ester dispersion comprises up to 1% by weight of emulsifier(s), based on the total monomer content.

17. The coating composition as claimed in claim 13, wherein a content of polymerized acids, acid anhydrides, or mixtures thereof in the multistage polyvinyl ester dispersion does not exceed 6% by weight, based on the total amount of monomers.

18. The coating composition as claimed in claim 13, wherein the at least one vinyl ester of a saturated carboxylic acid comprises vinyl acetate.

19. The coating composition as claimed in claim 18, wherein the at least one free-radically polymerizable monomer is an acrylate, a methacrylate, or a mixture thereof.

20. The coating composition as claimed in claim 18, wherein the vinyl acetate is copolymerized with an α-olefin in the first stage.

21. The coating composition as claimed in claim 13, wherein the vinyl ester of a saturated carboxylic acid comprises vinyl acetate and wherein the vinyl acetate is copolymerized with ethylene in the first stage and wherein the at least one free-radically polymerizable monomer is an acrylate, a methacrylate, or a mixture thereof.

22. A substrate coated with the coating composition of claim 13.

23. The substrate as claimed in claim 22, wherein the coating composition is a synthetic resin-bound plaster, a paste-form tile adhesive, a paste-form sealant, a paste-form sealing composition, a paper coating slip, or a paint.

24. The substrate as claimed in claim 23, wherein the paint is an emulsion paint, an emulsion coating, or a glaze.

25. The substrate as claimed in claim 22, wherein the substrate is a roof or a façade.

26. The coating composition as claimed in claim 13, wherein a film constructed from the coating composition comprises low reemulsifiability or no reemulsifiability.

27. The coating composition as claimed in claim 13, wherein at least one monomer containing an ethylenically unsaturated silane group or at least one ethylenically unsaturated epoxide compound is provided in the polymerization mixture in the first stage, is added in the second stage or both.

\* \* \* \* \*